US011833672B2

(12) United States Patent
Choi et al.

(10) Patent No.: US 11,833,672 B2
(45) Date of Patent: Dec. 5, 2023

(54) ROLL JOINT

(71) Applicant: INDUSTRY-UNIVERSITY COOPERATION FOUNDATION HANYANG UNIVERSITY ERICA CAMPUS, Ansan-si (KR)

(72) Inventors: Youngjin Choi, Seongnam-si (KR); Geon Lee, Yongin-si (KR); Geun Young Hong, Seoul (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 0 days.

(21) Appl. No.: 17/849,833

(22) Filed: Jun. 27, 2022

(65) Prior Publication Data
US 2022/0324122 A1    Oct. 13, 2022

Related U.S. Application Data

(63) Continuation of application No. PCT/KR2020/019025, filed on Dec. 23, 2020.

(30) Foreign Application Priority Data

Dec. 26, 2019 (KR) .................. 10-2019-0175070

(51) Int. Cl.
*B25J 17/02* (2006.01)
*B25J 9/00* (2006.01)
(Continued)

(52) U.S. Cl.
CPC ......... *B25J 17/0241* (2013.01); *B25J 9/0009* (2013.01); *B25J 9/1045* (2013.01); *B25J 9/126* (2013.01)

(58) Field of Classification Search
CPC ...... B25J 9/104; B25J 9/0078; B25J 17/0214; B25J 9/126
See application file for complete search history.

(56) References Cited

U.S. PATENT DOCUMENTS 10,624,455 B2 *   4/2020   Schiraga ................ A47C 7/008
2013/0090763 A1 * 4/2013   Simaan ...................... B25J 9/06
                                                                700/258
(Continued)

FOREIGN PATENT DOCUMENTS

CN     105856217 A     8/2016
JP      5299291 B2     9/2013
(Continued)

OTHER PUBLICATIONS

International Search Report for PCT/KR2020/019025 dated, Mar. 29, 2021 (PCT/ISA/210).

*Primary Examiner* — Gregory Robert Weber
(74) *Attorney, Agent, or Firm* — Sughrue Mion, PLLC

(57) ABSTRACT

A roll joint is provided. The roll joint may comprise: a first body; a second body disposed opposite to and spaced apart from the first body; a connection body which is disposed between the first body and the second body and is not in contact with the first body and the second body; and a connection wire member which connects the first body, the second body, and the connection body to one another so as to make a tensegrity structure.

10 Claims, 20 Drawing Sheets

(51) Int. Cl.
*B25J 9/10* (2006.01)
*B25J 9/12* (2006.01)

(56) References Cited

U.S. PATENT DOCUMENTS

2017/0209330 A1* 7/2017 Hughes ................ A61H 1/0266
2018/0326577 A1   11/2018 Chen et al.
2019/0382995 A1* 12/2019 Chen .................... B25J 19/0091

FOREIGN PATENT DOCUMENTS

| KR | 10-0997140 B1    | 11/2010 |
| KR | 10-2016-0026047 A |  3/2016 |
| KR | 10-2016-0119960 A | 10/2016 |
| KR | 10-2016-0124789 A | 10/2016 |
| KR | 10-2019-0006421 A |  1/2019 |
| KR | 10-2019-0129343 A | 11/2019 |

* cited by examiner

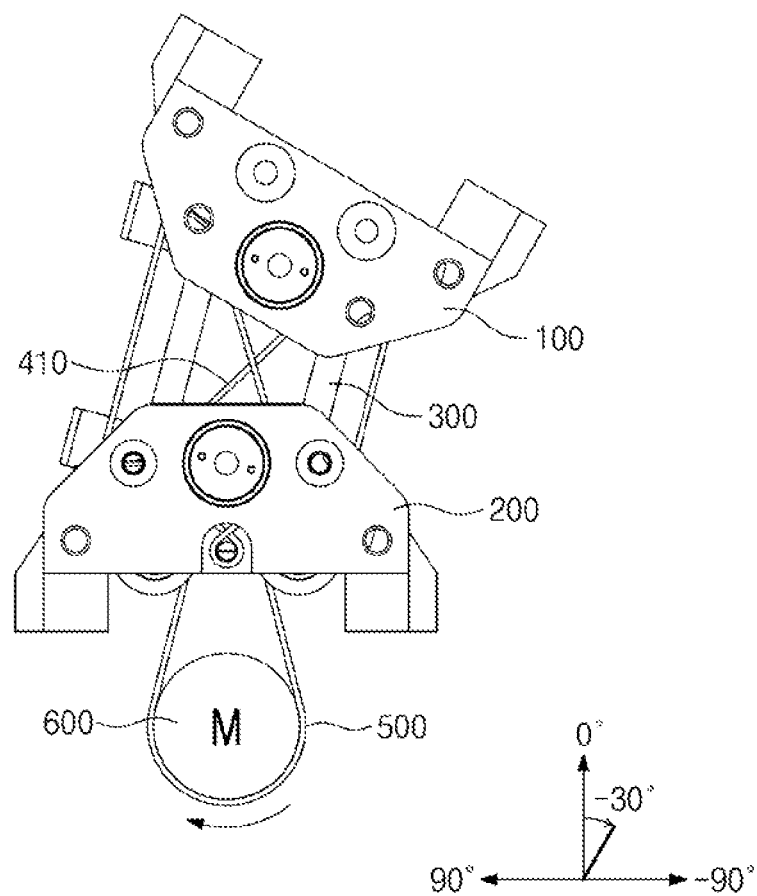
[Fig. 17]

[Fig. 18]
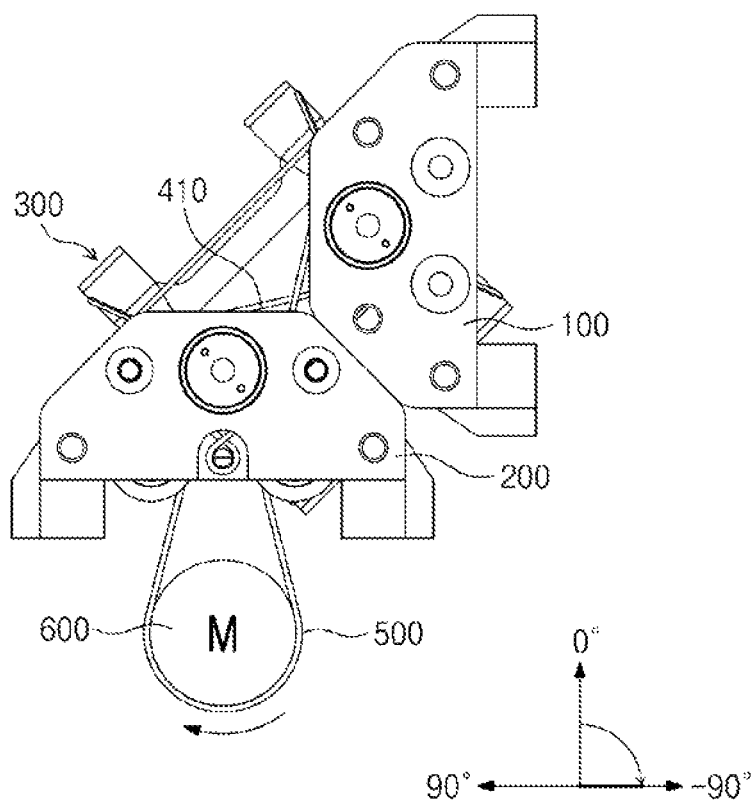

[Fig. 19]
S120
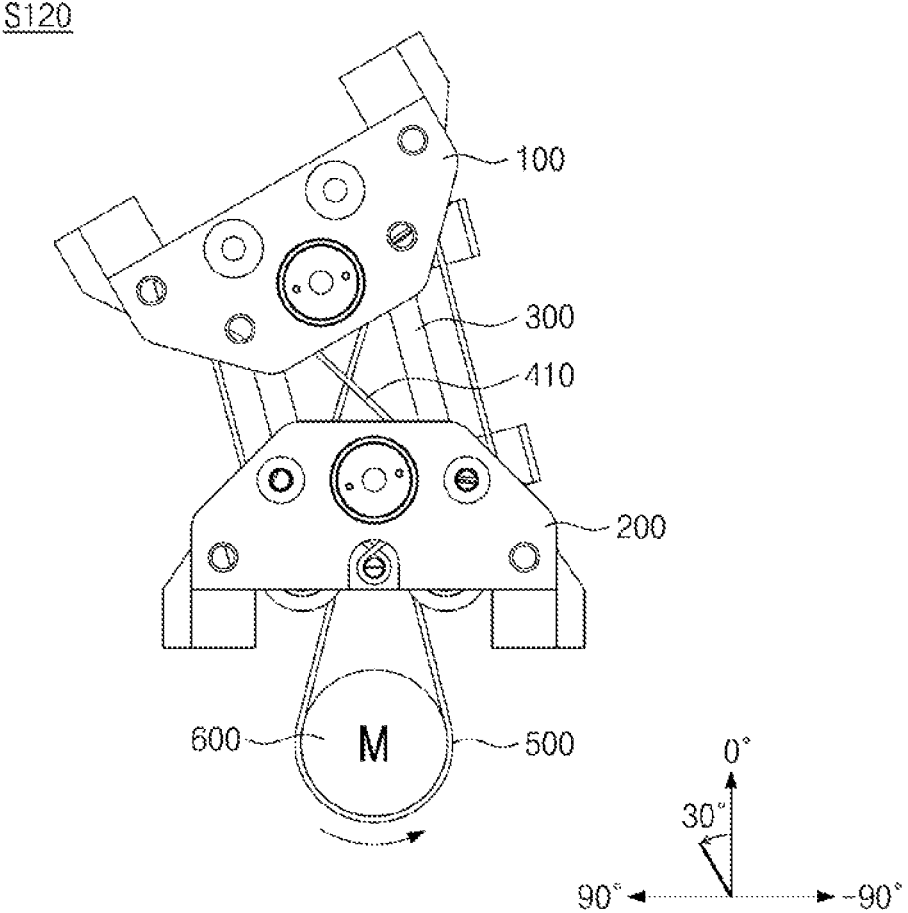

[Fig. 20]
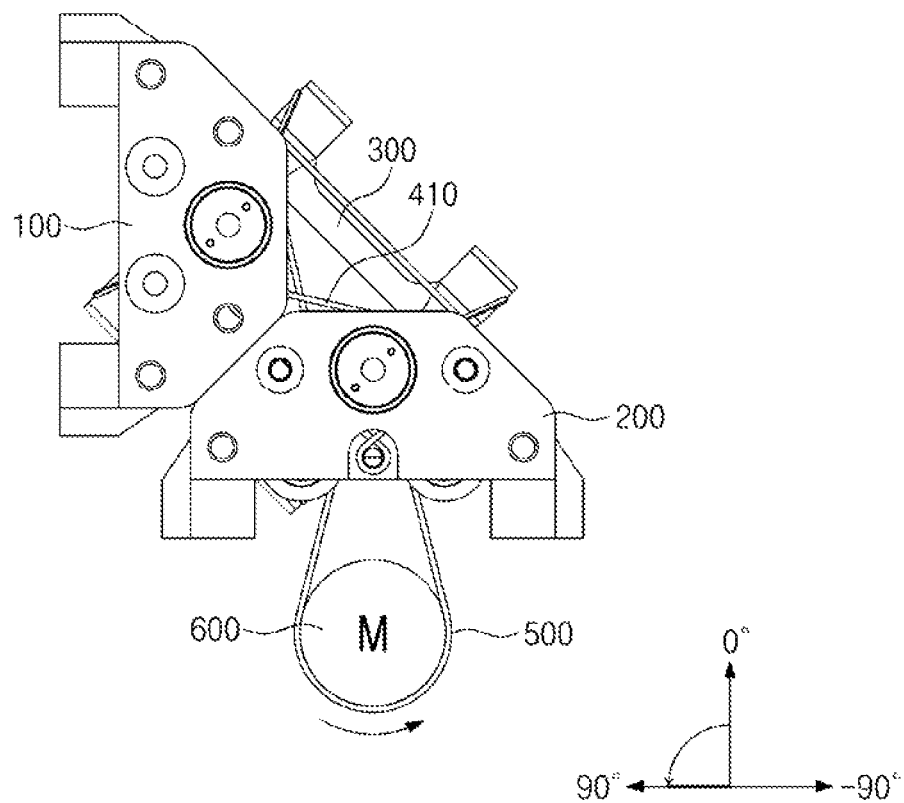

ROLL JOINT

TECHNICAL FIELD

The present invention relates to a roll joint, and more particularly, to a roll joint having flexibility.

BACKGROUND ART

Unlike industrial robots, service robots or rehabilitation robots may make contact with people in operations of the robots, so that even impacts that may be caused to the robots and the people by such contact have to be considered.

Most of existing robot joints or mechanical joints may be configured such that rigid bodies (links) are rigidly fixed to each other, and when an external impact occurs, the impact may be completely transmitted to a joint mechanism and an impact body. In addition, although flexibility in a rotation direction is sometimes applied through a control, flexibility in a rotation axis direction may not be applied only through a control technique. Furthermore, according to the existing mechanical joints, a repulsive force may act between the rigid bodies (links) to cause abrasion due to friction, and such abrasion may make it difficult to use the mechanical joints for a long time.

DISCLOSURE

Technical Problem

One technical object of the present invention is to provide a roll joint having flexibility or having improved flexibility.

Another technical object of the present invention is to provide a roll joint capable of adjusting a movable range.

Still another technical object of the present invention is to provide a roll joint capable of preventing abrasion caused by friction between bodies during a movement.

Technical objects of the present invention are not limited to the above technical objects.

Technical Solution

To achieve the technical objects described above, the present invention provides a roll joint.

According to one embodiment, the grip strength roll joint includes: a first body; a second body disposed opposite to and spaced apart from the first body; a connection body disposed between the first body and the second body without making contact with the first body and the second body; and a connection wire member for connecting the first body, the second body, and the connection body to each other so as to form a tensegrity structure.

According to one embodiment, when viewed in a direction opposite to the second body, the first body may have flexibility in a yaw direction, a roll direction, and the opposite direction.

According to one embodiment, the connection wire member may include: a first connection wire for connecting the first body to the second body; a second connection wire for connecting the first body to the connection body; and a third connection wire for connecting the second body to the connection body, and the first to third connection wires may achieve equilibrium of force to maintain the tensegrity structure.

According to one embodiment, the first body may include a first frame extending in one direction, and second frames provided at both ends of the first frame in a longitudinal direction, respectively, the second body may include a third frame extending in the one direction and facing the first frame, and fourth frames provided at both ends of the third frame in the longitudinal direction and facing the second frames, respectively, and the connection body may include a fifth frame disposed in a vertical direction between the first body and the second body, first and second wire connectors provided on an upper side of the fifth frame in a width direction, and third and fourth wire connectors provided on a lower side of the fifth frame in the width direction.

According to one embodiment, the first connection wire may connect the second frame to the fourth frame, and may include a withdrawal line extending from the second frame and wound on the fourth frame, and a recovery line connected to the withdrawal line, extending from the fourth frame, and recovered on the second frame.

According to one embodiment, the withdrawal line and the recovery line may intersect with each other at least once.

According to one embodiment, a plurality of second connection wires may be provided, and the second connection wires may connect the second frame on one side and the first wire connector, the second frame on the one side and the second wire connector, the second frame on an opposite side and the first wire connector, and the second frame on the opposite side and the second wire connector, respectively.

According to one embodiment, a plurality of third connection wires may be provided, and the third connection wires may connect the fourth frame on one side and the third wire connector, the fourth frame on the one side and the fourth wire connector, the fourth frame on an opposite side and the third wire connector, and the fourth frame on the opposite side and the fourth wire connector, respectively.

According to one embodiment, each of end surfaces of the second and fourth frames, which face each other, may include a horizontal surface, and inclined surfaces extending from both ends of the horizontal surface in the longitudinal direction, respectively, and the inclined surfaces on both sides may have a same inclination.

According to one embodiment, the first body may have one rotational degree of freedom with respect to the second body, and the first body may be pitch-rotatable with respect to the second body in a range of −90 degrees to 90 degrees.

According to one embodiment, the roll joint may further include a driving wire member, and a driving motor for operating the driving wire member, the driving wire member may be connected to the first body and the second body such that both ends of the driving wire member in the longitudinal direction are fixed to one side and an opposite side of the first body, respectively, and a center portion of the driving wire member in the longitudinal direction is connected to a rotation shaft of the driving motor, and the driving wire member may move in a direction in which the rotation shaft of the driving motor rotates so as to pull the one side or the opposite side of the first body such that a virtual circle formed by the first body rolls in a circumferential direction on a virtual circle formed by the second body.

Advantageous Effects

According to an embodiment of the present invention, the roll joint includes: a first body; a second body disposed opposite to and spaced apart from the first body; a connection body disposed between the first body and the second body without making contact with the first body and the second body; and a connection wire member for connecting the first body, the second body, and the connection body to each other so as to form a tensegrity structure. Accordingly, a roll joint having flexibility or having improved flexibility may be provided. Therefore, an external force applied to the body may be distributed, so that buckling of the body may be prevented. As a result, design requirements of the body may be relaxed, so that a lightweight roll joint may be provided.

In addition, according to the embodiment of the present invention, a roll joint capable of adjusting a movable range by adjusting inclinations of the inclined surfaces of the second and fourth frames may be provided.

In addition, according to the embodiment of the present invention, a roll joint capable of preventing abrasion caused by friction between the bodies during a movement by maintaining the first body, the second body, and the connection body in a non-contact state with each other by the connection wire member may be provided.

DESCRIPTION OF DRAWINGS

FIGS. 17 and 18 are schematic views showing a step S110 in the method of driving the roll joint according to one embodiment of the present invention.

FIGS. 19 and 20 are schematic views showing a step S120 in the method of driving the roll joint according to one embodiment of the present invention.

MODE FOR INVENTION

Figure 1:
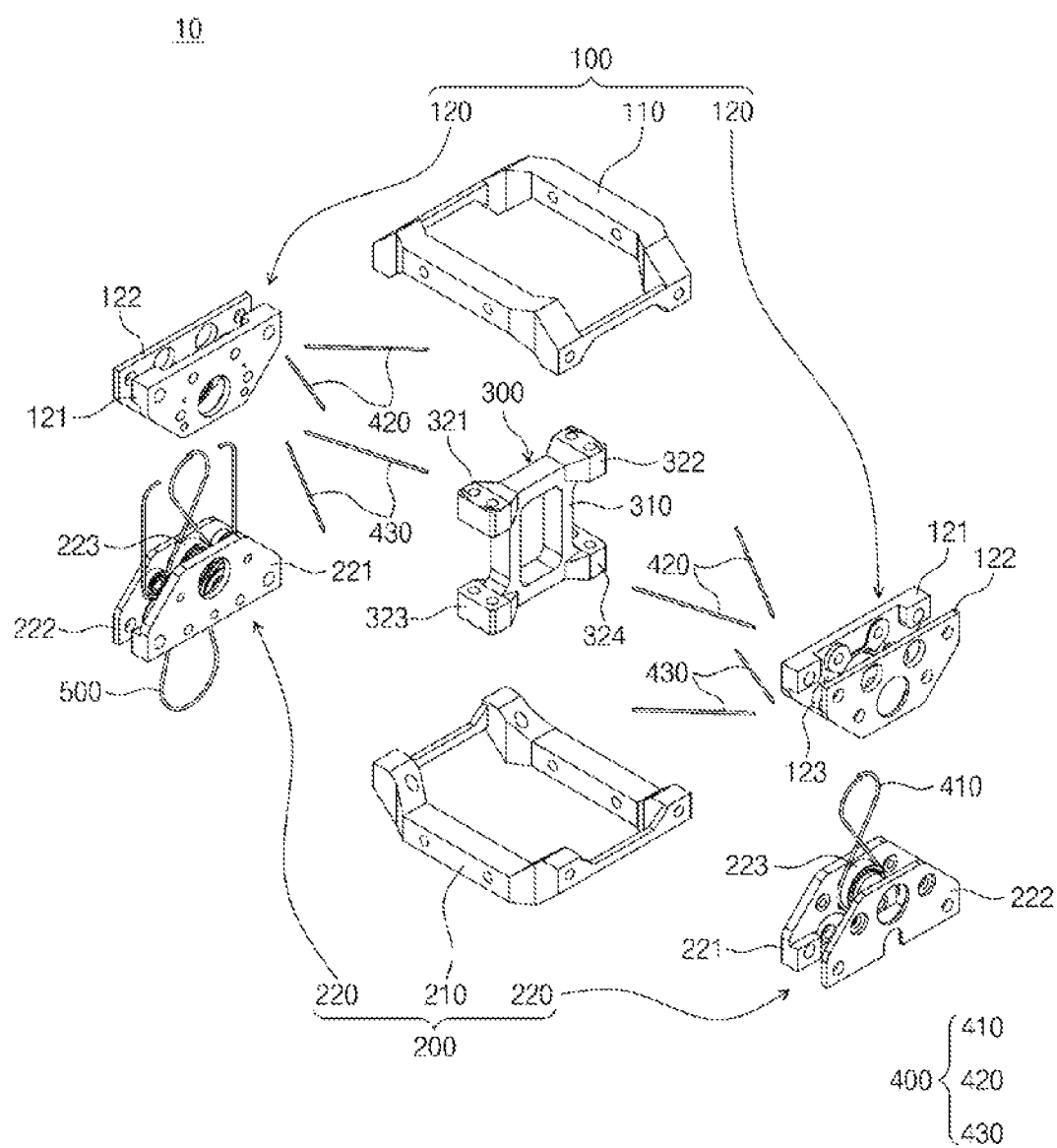
FIG. 1 is an exploded perspective view showing a roll joint according to one embodiment of the present invention.
Figure 2:
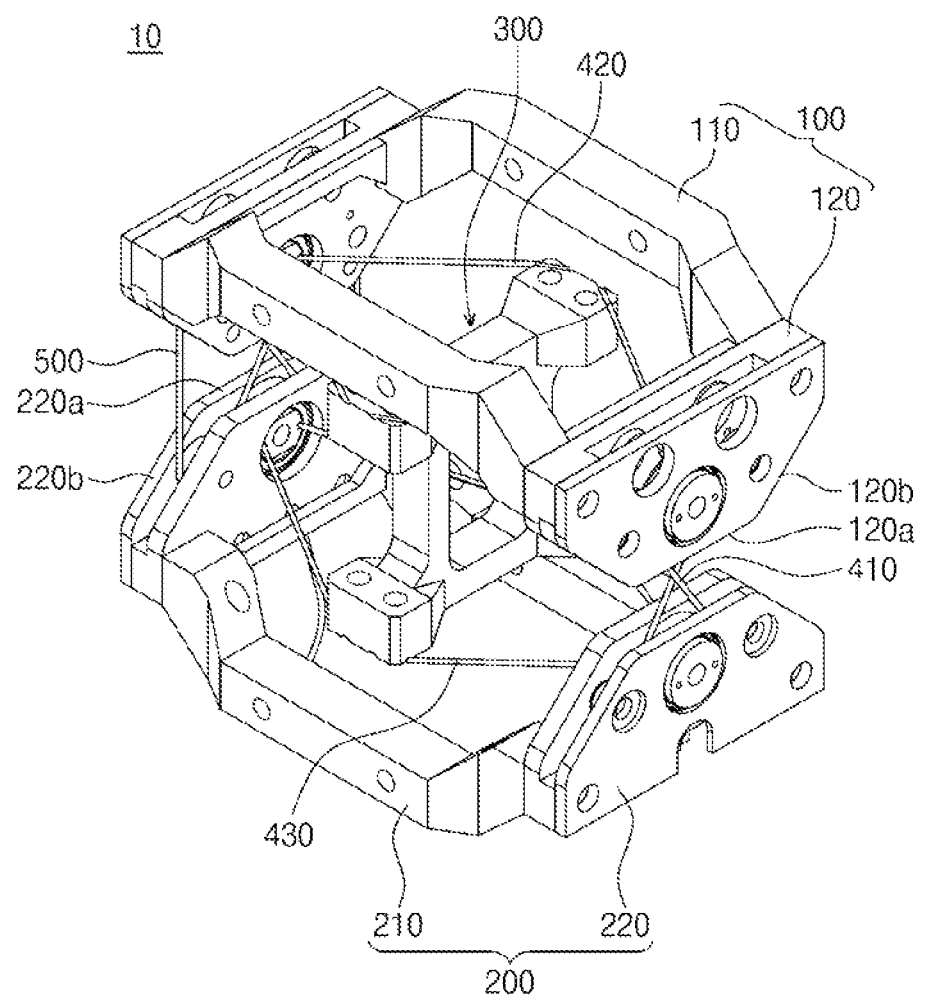
FIG. 2 is a coupled perspective view of FIG. 1.
Figure 3:
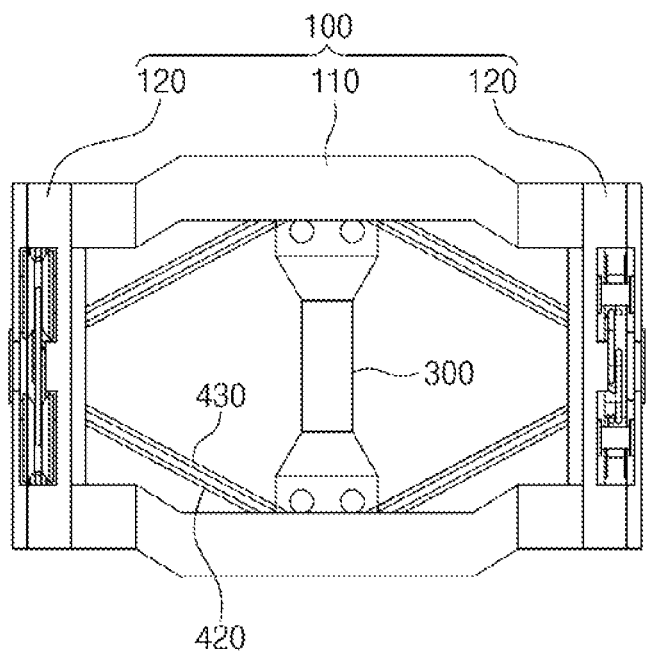
FIG. 3 is a plan view of FIG. 2.

Hereinafter, exemplary embodiments of the present invention will be described in detail with reference to the accompanying drawings. However, the technical idea of the present invention is not limited to the embodiments described herein, but may be realized in different forms. The embodiments introduced herein are provided to sufficiently deliver the idea of the present invention to those skilled in the art so that the disclosed contents may become thorough and complete.

When it is mentioned in the present disclosure that one element is on another element, it means that one element may be directly formed on another element, or a third element may be interposed between one element and another element. Further, in the drawings, thicknesses of films and areas are exaggerated for efficient description of the technical contents.

In addition, in the various embodiments of the present disclosure, the terms such as first, second, and third are used to describe various elements, but the elements are not limited to the terms. The terms are used only to distinguish one element from another element. Therefore, an element mentioned as a first element in one embodiment may be mentioned as a second element in another embodiment. The embodiments described and illustrated herein include their complementary embodiments. Further, the term "and/or" used herein is used to include at least one of the elements enumerated before and after the term.

As used herein, the terms of a singular form may include plural forms unless the context clearly indicates otherwise. Further, the terms such as "including" and "having" are used to designate the presence of features, numbers, steps, elements, or combinations thereof described in the present disclosure, and shall not be construed to preclude any possibility of the presence or addition of one or more other features, numbers, steps, elements, or combinations thereof. In addition, the term "connection" used herein is used to include both indirectly and directly connecting a plurality of elements.

Further, in the following description of the present invention, detailed descriptions of known functions and configurations incorporated herein will be omitted when they may make the subject matter of the present invention unnecessarily unclear.

FIGS. 1 to 15 are views for describing a roll joint according to one embodiment of the present invention.

As shown in FIGS. 1 to 5, according to one embodiment of the present invention, a roll joint 10 may include a first body 100, a second body 200, a connection body 300, and a connection wire member 400.

The first body 100 may include a first frame 110 and a second frame 120. The first frame 110 may extend in one direction, and have a predetermined shape. For example, the first frame 110 may have a rectangular frame shape having a center portion that is opened. Second frames 120 may be provided at both ends of the first frame 110 in a longitudinal direction, respectively. In other words, the first body 100 may include one first frame 110 and two second frames 120.

The second frames 120 may be provided at the both ends of the first frame 110 in the longitudinal direction in a direction that is orthogonal to the first frame 110, respectively. The second frame 120 may include a frame body 121, a cover plate 122, and a wire mounter 123.

Each of the frame body 121 and the cover plate 122 may have a plate shape. The frame body 121 and the cover plate 122 may have external appearances that are identical or similar to each other. The frame body 121 and the cover plate 122 may be disposed opposite to and spaced apart from each other.

The frame body 121 and the cover plate 122 may be coupled to each other by a plurality of wire mounters 123 protruding from one surface of the frame body 121 toward the cover plate 122. In other words, the frame body 121 and the cover plate 122 may be coupled to each other by fitting the wire mounters 123 provided on the one surface of the frame body 121 to a plurality of reception grooves or reception holes formed in the cover plate 122, so that the second frame 120 having a double partition wall structure may be formed.

In this case, one or both ends of the connection wire member 400 and a driving wire member 500 that will be described below may be fixed to or wound on circumferential surfaces of the wire mounters 123.

Meanwhile, one end surface of the second frame 120, more specifically, each of end surfaces of the frame body 121 and the cover plate 122, which face the second body 200, may include a horizontal surface 120a and an inclined surface 120b.

Inclined surfaces 120b may be provided at both ends of the horizontal surface 120a with the horizontal surface 120a interposed therebetween, respectively. The inclined surface 120b may have a shape inclined upward from the both ends of the horizontal surface 120a in the longitudinal direction (based on the drawing). In this case, the inclined surfaces 120b on both sides may have the same inclination. According to an embodiment of the present invention, a movable range of the first body 100 may be restricted by the inclination of the inclined surface 120b, which will be described in more detail below.

Referring to FIGS. 1 to 5, the second body 200 may be disposed opposite to and spaced apart from the first body 100. According to one embodiment of the present invention, even when the first body 100 rotates about the second body 200, the first body 100 and the second body 200 may be prevented from making contact with each other. Accordingly, abrasion caused by friction between the first body 100 and the second body 200 during a rotational movement of the first body 100 may be prevented.

The second body 200 may have an external appearance that is identical or similar to an external appearance of the first body 100. The second body 200 may include a third frame 210 and a fourth frame 220. The third frame 210 may extend in one direction, and have a predetermined shape.

For example, similar to the first frame 110, the third frame 210 may have a rectangular frame shape having a center portion that is opened. Fourth frame 220 may be provided at both ends of the third frame 210 in the longitudinal direction, respectively. In other words, the second body 200 may include one third frame 210 and two fourth frames 220.

The fourth frames 220 may be provided at the both ends of the third frame 210 in the longitudinal direction in a direction that is orthogonal to the third frame 210, respectively. The fourth frame 220 may include a frame body 221, a cover plate 222, and a wire mounter 223.

Each of the frame body 221 and the cover plate 222 may have a plate shape. The frame body 221 and the cover plate 222 may have external appearances that are identical or similar to each other. The frame body 221 and the cover plate 222 may be disposed opposite to and spaced apart from each other.

The frame body 221 and the cover plate 222 may be coupled to each other by a plurality of wire mounters 223 protruding from one surface of the frame body 221 toward the cover plate 222. In other words, the frame body 221 and the cover plate 222 may be coupled to each other by fitting the wire mounters 223 provided on the one surface of the frame body 221 to a plurality of reception grooves or reception holes formed in the cover plate 222, so that the fourth frame 220 having a double partition wall structure may be formed.

In this case, one or both ends of the connection wire member 400 and the driving wire member 500 that will be described below may be fixed to or wound on circumferential surfaces of the wire mounters 223.

Meanwhile, one end surface of the fourth frame 420, more specifically, each of end surfaces of the frame body 221 and the cover plate 222, which face the first body 100, may include a horizontal surface 220a and an inclined surface 220b.

Inclined surfaces 220b may be provided at both ends of the horizontal surface 220a with the horizontal surface 220a interposed therebetween, respectively. The inclined surface 220b may have a shape inclined downward from the both ends of the horizontal surface 220a in the longitudinal direction (based on the drawing). In this case, the inclined surfaces 220b on both sides may have the same inclination.

According to one embodiment of the present invention, the second frame 120 of the first body 100 and the fourth frame 220 of the second body 200 may face each other in a vertical direction (based on the drawing). In this case, the inclined surface 120b of the second frame 120 and the inclined surface 220b of the fourth frame 220 may have the same inclination except that inclined directions of the inclined surface 120b and the inclined surface 220b are opposite to each other.

For example, in a case where the first body 100 rotates about the second body 200, when the first body 100 reaches a maximum movable range, the inclined surface 120b of the second frame 120 and the inclined surface 220b of the fourth frame 220 may make contact with each other, so that a further rotation of the first body 100 may be restricted.

According to the embodiment of the present invention, the first body 100 may have one rotational degree of freedom with respect to the second body 200. In other words, the first body 100 may be pitch-rotatable with respect to the second body 200. For example, the first body 100 may be pitch-rotatable with respect to the second body 200 in a range of −90 degrees to 90 degrees.

To this end, the inclinations of the inclined surface 120b of the second frame 120 and the inclined surface 220b of the fourth frame 220 may be adjusted. However, since the above configuration is only an example, a pitch rotation range of the first body 100 with respect to the second body 200 may become wider or narrower than the above range through the adjustment of the inclinations of the inclined surface 120b of the second frame 120 and the inclined surface 220b of the fourth frame 220.

Referring to FIGS. 1 to 5, the connection body 300 may be disposed between the first body 100 and the second body 200. In this case, the connection body 300 may not make contact with the first body 100 and the second body 200. Accordingly, even when the first body 100 pitch-rotates with respect to the second body 200, the first body 100, the second body 200, and the connection body 300 may be prevented from making contact with each other. Accordingly, abrasion caused by friction among the first body 100, the second body 200, and the connection body 300 during a rotational movement of the first body 100, for example, during a pitch rotation of the first body 100 may be prevented.

The connection body 300 may include a fifth frame 310, and first to fourth wire connectors 321 to 324. The fifth frame 310 may be disposed in the vertical direction in a space formed between the first body 100 and the second body 200, which are disposed opposite to each other. According to the embodiment of the present invention, the fifth frame 310 may be configured as a frame having approximately a '#' shape.

The first wire connector 321 may be provided on an upper side of the fifth frame 310. The first wire connector 321 may be provided at one edge of the fifth frame 310 in a width direction. The first wire connector 321 may be connected to one end of a second connection wire 420 of the connection wire member 400, which will be described below, in the longitudinal direction. In this case, one ends of two second connection wires 420 in the longitudinal direction may be connected to one side and an opposite side of the first wire connector 321, respectively.

The second wire connector 322 may be provided on the upper side of the fifth frame 310. The second wire connector 322 may be provided at an opposite edge of the fifth frame 310 in the width direction. Similar to the first wire connector 321, one ends of two second connection wires 420 in the longitudinal direction may be connected to one side and an opposite side of the second wire connector 322, respectively.

The third wire connector 323 may be provided on a lower side of the fifth frame 310. The third wire connector 323 may be provided at one edge of the fifth frame 310 in the width direction. The third wire connector 323 may be provided at a position corresponding to the first wire connector 323 in the vertical direction. The third wire connector 323 may be connected to one end of a third connection wire 430 of the connection wire member 400, which will be described below, in the longitudinal direction.

In this case, one ends of two third connection wires 430 in the longitudinal direction may be connected to one side and an opposite side of the third wire connector 323, respectively.

The fourth wire connector 324 may be provided on the lower side of the fifth frame 310. The fourth wire connector 324 may be provided at an opposite edge of the fifth frame 310 in the width direction. The fourth wire connector 324 may be provided at a position corresponding to the second wire connector 322 in the vertical direction.

The fourth wire connector 324 may be connected to one end of the third connection wire 430 in the longitudinal direction. In this case, similar to the third wire connector 323, one ends of two third connection wires 430 in the longitudinal direction may be connected to one side and an opposite side of the fourth wire connector 324, respectively.

Referring to FIGS. 1 to 5, the connection wire member 400 may connect the first body 100, the second body 200, and the connection body 300 to each other so as to form a tensegrity structure. The connection wire member 400 may include a first connection wire 410, a second connection wire 420, and a third connection wire 430, and may connect and support the first body 100, the second body 200, and the connection body 300 while the first connection wire 410, the second connection wire 420, and the third connection wire 430 achieve equilibrium of force so as to maintain the tensegrity structure.

Figure 4:
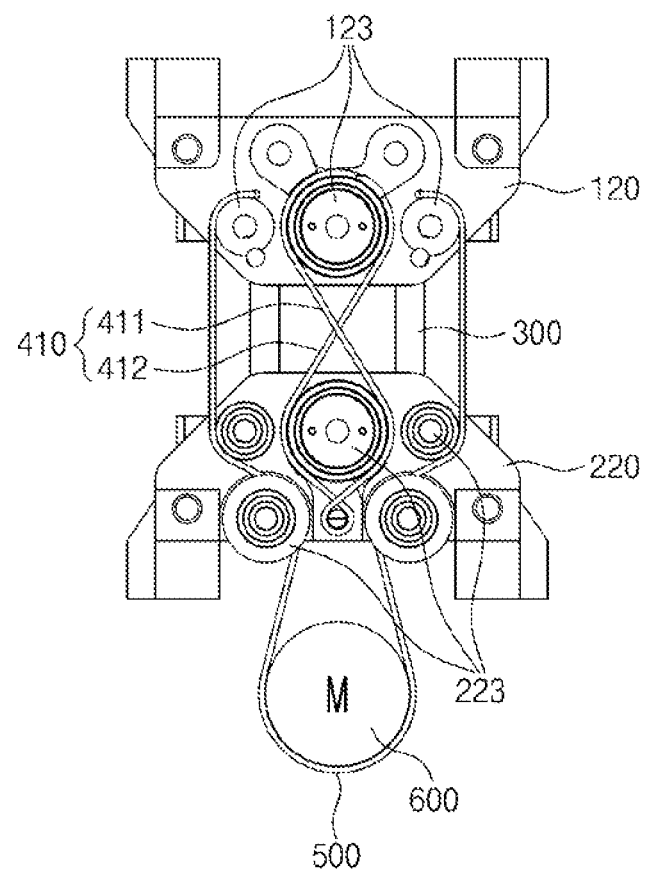
FIG. 4 is a side view of FIG. 2.
Figure 5:
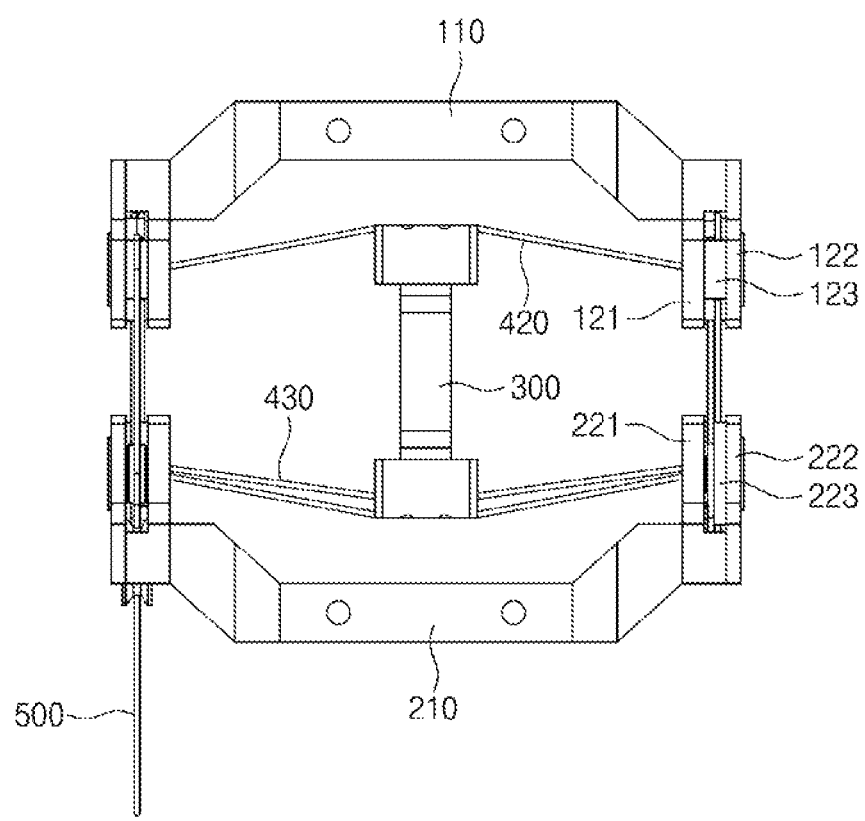
FIG. 5 is a front view of FIG. 2.

Referring to FIG. 4, the first connection wire 410 may be formed of a material having elasticity. The first connection wire 410 may have flexibility in a long axis direction. In addition, elasticity of the first connection wire 410 may be adjusted. Accordingly, the roll joint 10 having flexibility or having improved flexibility may be provided.

The first connection wire 410 may connect the first body 100 to the second body 200. In more detail, the first connection wire 410 may connect the second frame 120 of the first body 100 to the fourth frame 220 of the second body 200.

In this case, a pair of first connection wires 410 may be provided, one of the first connection wires 410 may connect the second frame 120 and the fourth frame 220, which are vertically aligned on one side, and remaining one of the first connection wires 410 may connect the second frame 120 and the fourth frame 220, which are vertically aligned on an opposite side.

According to one embodiment of the present invention, the first connection wire 410 may be divided into a withdrawal line 411 and a recovery line 412 based on the longitudinal direction.

An end of the withdrawal line 411 may be fixed to the wire mounter 123 provided on the second frame 120. The withdrawal line 411 having the end fixed to the wire mounter 123 may extend from the second frame 120 and may be wound around the wire mounter 223 that is provided on the fourth frame 220.

In addition, the recovery line 412 connected to the withdrawal line 411 may extend from the fourth frame 220 and may be recovered on the second frame 120, and an end of the recovery line 412 may be fixed to the wire mounter 123 of the second frame 120 to which the end of the withdrawal line 411 is fixed. In this case, according to one embodiment of the present invention, the withdrawal line 411 and the recovery line 412 may intersect with each other at least once. As shown in FIG. 4, the withdrawal line 411 and the recovery line 412 may intersect with each other twice in an 'X' shape.

Referring to FIGS. 1 to 5, the second connection wire 420 may be formed of a material having elasticity. The second connection wire 420 may have flexibility in the long axis direction. In addition, elasticity of the second connection wire 420 may be adjusted. Accordingly, the roll joint 10 having flexibility or having improved flexibility may be provided.

The second connection wire 420 may connect the first body 100 to the connection body 300. In more detail, the second connection wire 420 may connect the second frame 120 of the first body 100 to the first wire connector 321 and the second wire connector 322 of the connection body 300. According to one embodiment of the present invention, a plurality of second connection wires 420 may be provided.

For example, four second connection wires 420 may be provided. First, first one among the second connection wires 420 may be installed between the second frame 120 on one side and the first wire connector 321 to connect the second frame 120 on the one side to the first wire connector 321. Second one among the second connection wires 420 may be installed between the second frame 120 on the one side and the second wire connector 322 to connect the second frame 120 on the one side to the second wire connector 322. In addition, third one among the second connection wires 420 may be installed between the second frame 120 on an opposite side and the first wire connector 321 to connect the second frame 120 on the opposite side to the first wire connector 321. Fourth one among the second connection wires 420 may be installed between the second frame 120 on the opposite side and the second wire connector 322 to connect the second frame 120 on the opposite side to the second wire connector 322.

The third connection wire 430 may be formed of a material having elasticity. The third connection wire 430 may have flexibility in the long axis direction. In addition, elasticity of the third connection wire 430 may be adjusted. Accordingly, the roll joint 10 having flexibility or having improved flexibility may be provided.

The third connection wire 430 may connect the second body 200 to the connection body 300. In more detail, the third connection wire 430 may connect the fourth frame 220 of the second body 200 to the third wire connector 323 and the fourth wire connector 324 of the connection body 300. According to one embodiment of the present invention, a plurality of third connection wires 430 may be provided.

For example, four third connection wires 430 may be provided for balance with the second connection wires 420. However, since the above configuration is only an example, a predetermined number of second connection wires 420 and third connection wires 430 may be selected and provided within a range that may achieve equilibrium of force with the first connection wire 410.

For example, when four third connection wires 430 are provided, first, first one among the third connection wires 430 may be installed between the fourth frame 220 on one side and the third wire connector 323 to connect the fourth frame 220 on the one side to the third wire connector 323. Second one among the third connection wires 430 may be installed between the fourth frame 220 on the one side and the fourth wire connector 324 to connect the fourth frame 220 on the one side to the fourth wire connector 324. Third one among the third connection wires 430 may be installed between the fourth frame 220 on an opposite side and the third wire connector 323 to connect the fourth frame 220 on the opposite side to the third wire connector 323. Fourth one among the third connection wires 430 may be installed between the fourth frame 220 on the opposite side and the fourth wire connector 324 to connect the fourth frame 220 on the opposite side to the fourth wire connector 324.

As described above, the first body 100, the second body 200, and the connection body 300 may be connected to each other without making contact with each other by the first connection wire 410, the second connection wire 420, and the third connection wire 430, and the first connection wire 410, the second connection wire 420, and the third connection wire 430 that support the first body 100, the second body 200, and the connection body 300 may achieve the equilibrium of force, so that the roll joint 10 according to one embodiment of the present invention may form the tensegrity structure.

Accordingly, when viewed in a direction opposite to the second body 200, the first body 100 may have a rotational degree of freedom that is restricted in a yaw direction, a roll direction, and the opposite direction, may have a rotational degree of freedom in a pitch direction, and may have flexibility in the yaw direction, the roll direction, and the opposite direction. Therefore, external forces applied to the bodies 100 and 200 may be distributed, so that buckling of the bodies 100 and 200 may be prevented. As a result, design requirements of the bodies 100 and 200 may be relaxed, so that a lightweight roll joint 10 may be provided.

In this case, it is assumed for convenience of description that the first body 100 is a rotating body, and the second body 200 is a fixed body, so that the second body 200 may be a rotating body, and the first body 100 may be a fixed body.

Meanwhile, referring to FIG. 4, according to one embodiment of the present invention, the roll joint 10 may further include a driving wire member 500, and a driving motor 600 for operating the driving wire member 500.

The driving wire member 500 may be connected to the first body 100 and the second body 200. In more detail, the driving wire member 500 may be connected to the wire mounter 123 of the second frame 120 and the wire mounter 223 of the fourth frame 220. In this case, one end of the driving wire member 500 in the longitudinal direction may be fixed to one wire mounter 123 of the second frame 120, and an opposite end of the driving wire member 500 in the longitudinal direction may be fixed to another wire mounter 123 that is disposed on the same line as the one wire mounter 123 in the horizontal direction.

In addition, a center portion of the driving wire member 500 in the longitudinal direction may be connected to a rotation shaft of the driving motor 600.

The driving wire member 500 may move in a direction in which the rotation shaft of the driving motor 600 rotates so as to pull the one side or the opposite side of the first body 100, more specifically, the second frame 120 in the width direction toward the second body 200. Accordingly, the first body 100 may pitch-rotate in one direction or an opposite direction about the second body 200.

According to the roll joint 10 of one embodiment of the present invention, the first body 100, the second body 200, and the connection body 300 may be connected to each other by the first connection wire 410, the second connection wire 420, and the third connection wire 430, which achieve the equilibrium of force, so as to form the tensegrity structure. Accordingly, when viewed from a direction in which the first body 100 is opposite to the second body 200, the first body 100 may have a rotational degree of freedom that is restricted in a yaw rotation (YR), a roll rotation (RR) and the opposite direction with respect to the second body 200, may have having one rotational degree of freedom for a pitch rotation (PR), and may have flexibility in the yaw direction, the roll direction, and the opposite direction.

FIGS. 6 to 12 are schematic views sequentially showing states in which the roll joint rotates within a radius of rotation according to one embodiment of the present invention, which show that a first body pitch-rotates in a range of −90 degrees to 90 degrees.

Figure 6:
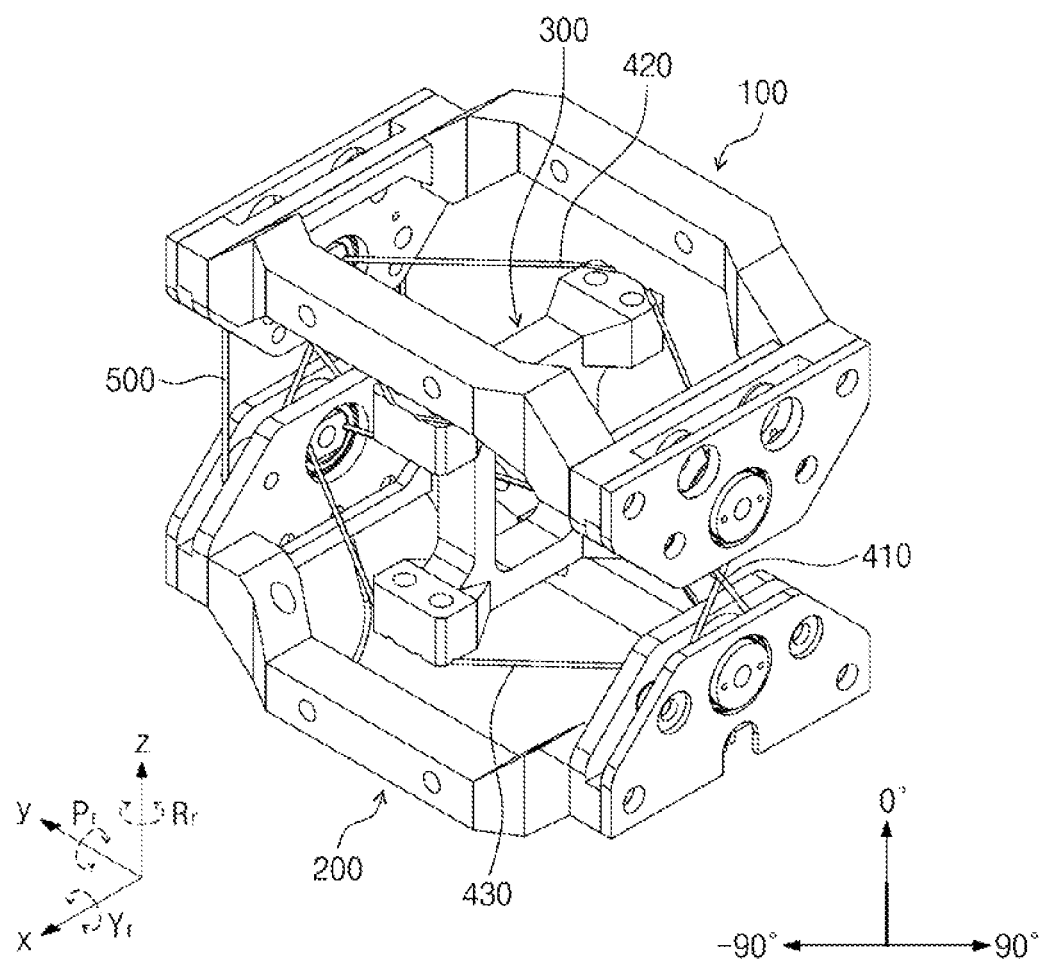
FIGS. 6 to 12 are schematic views sequentially showing states in which the roll joint rotates within a radius of rotation according to one embodiment of the present invention.

Referring to FIG. 6, when a pitch rotation angle of the first body 100 is 0 degrees, the first body 100 and the second body 200 may be maintained to be spaced apart from each other so as to be vertically parallel with each other.

Figure 7:
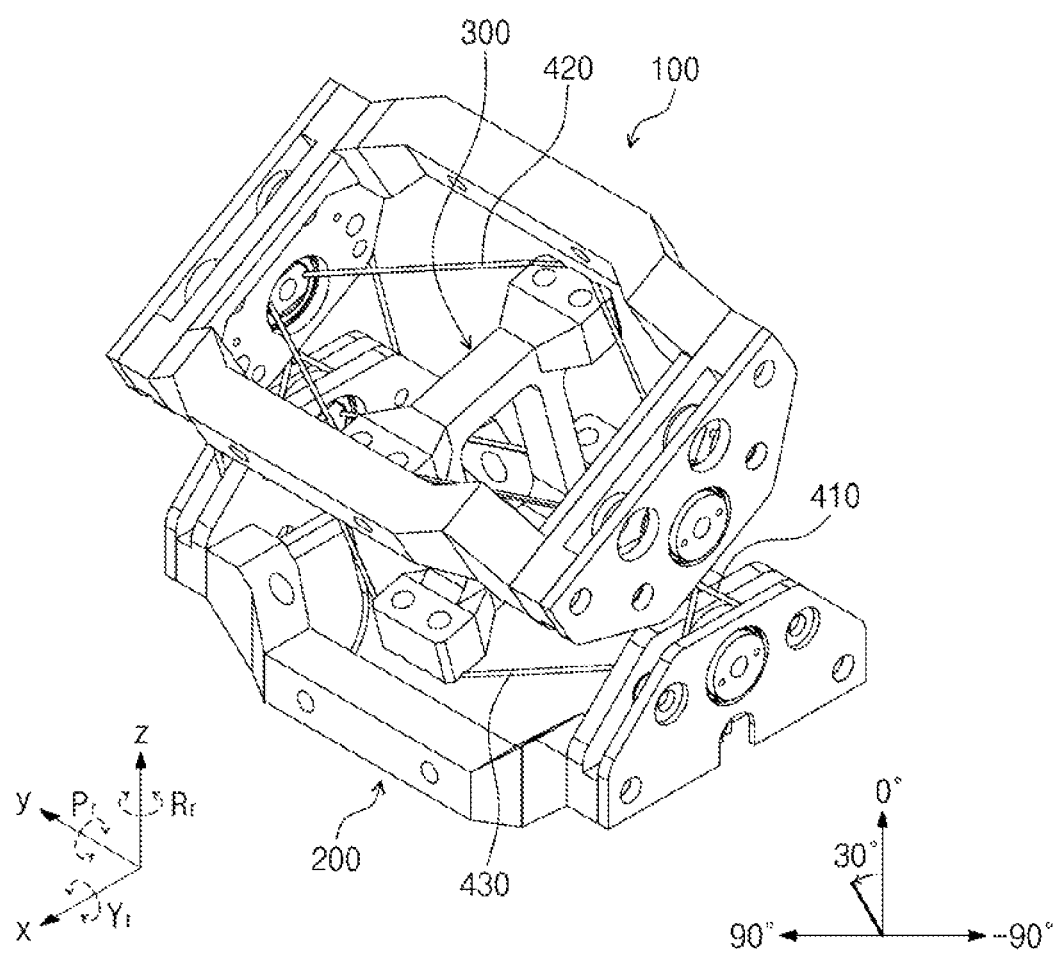
Figure 8:
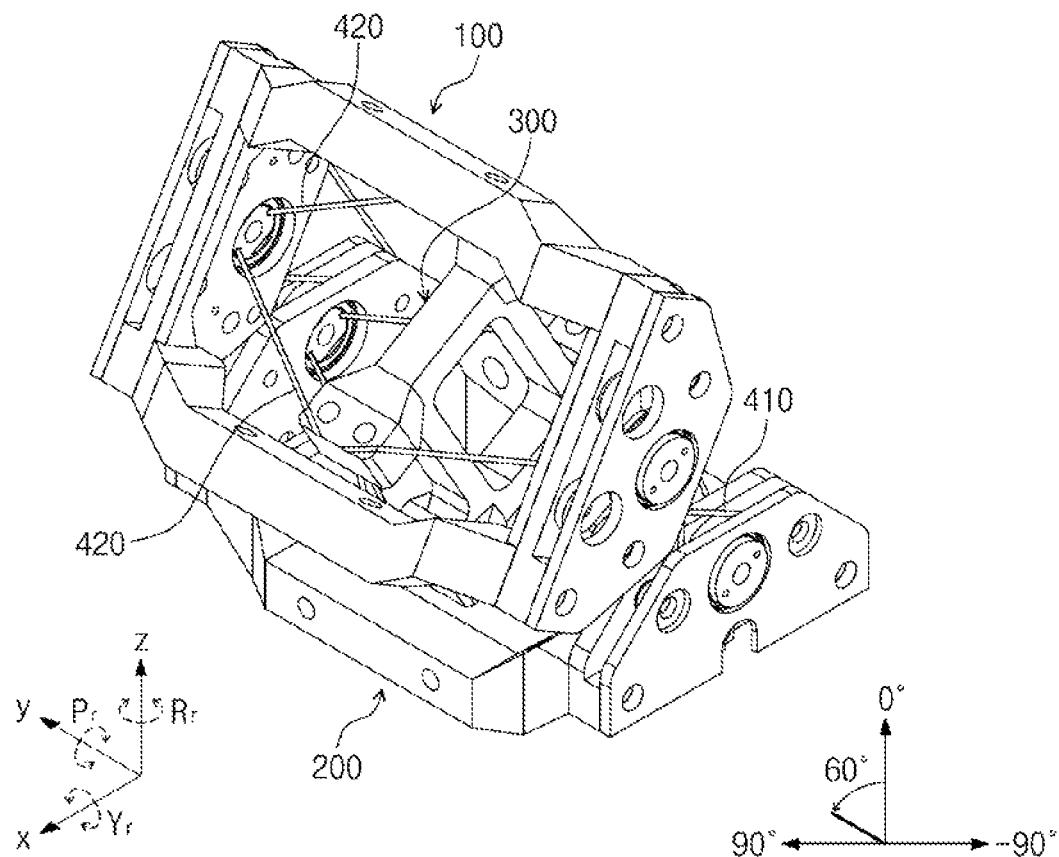

Referring to FIGS. 7 and 8, even when the pitch rotation angle of the first body 100 in one direction is gradually increased to 30 degrees and 60 degrees, a non-contact state between the first body 100 and the second body 200 may be maintained. Accordingly, abrasion caused by friction between the bodies 100 and 200 may be prevented.

Figure 9:
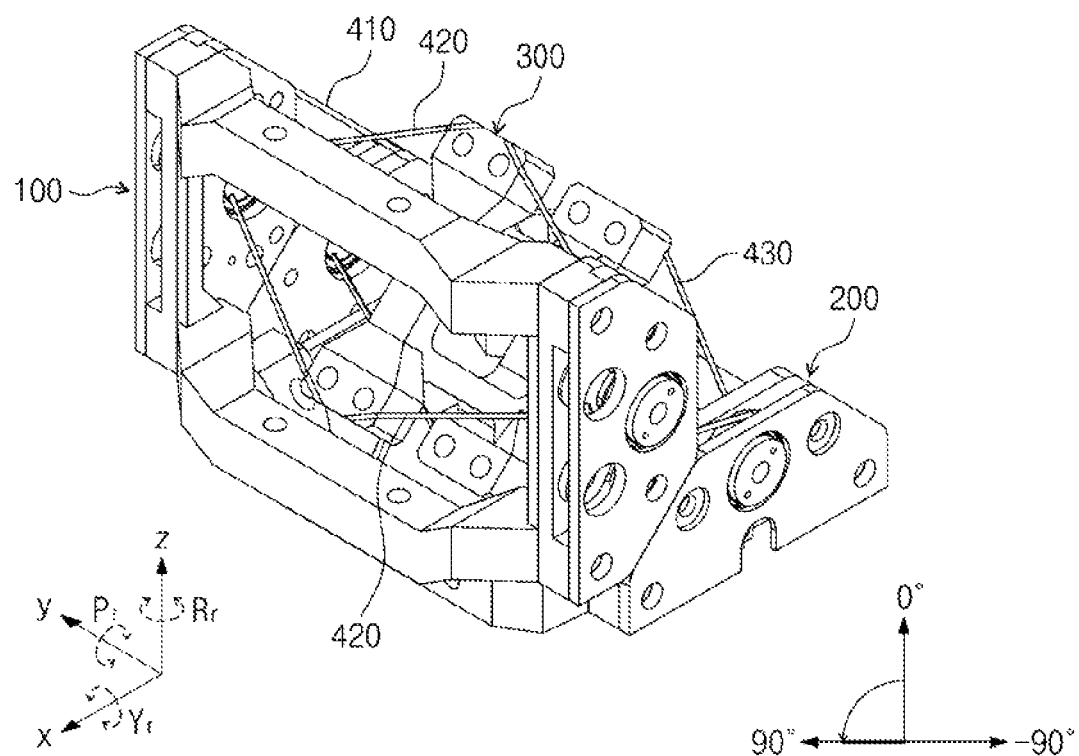

Thereafter, referring to FIG. 9, when the pitch rotation angle of the first body 100 in the one direction reaches a set maximum rotation angle of 90 degrees, one inclined surface 120*b* of the first body 100 and one inclined surface 220*b* of the second body 200 corresponding to the one inclined surface 120*b* of the first body 100 may make contact with each other, so that a further pitch rotation of the first body 100 may be restricted. In this case, the maximum rotation angle of the first body 100 in the one direction may be increased or decreased by adjusting the inclinations of the one inclined surface 120*b* of the first body 100 and the one inclined surface 220*b* of the second body 200.

Figure 10:
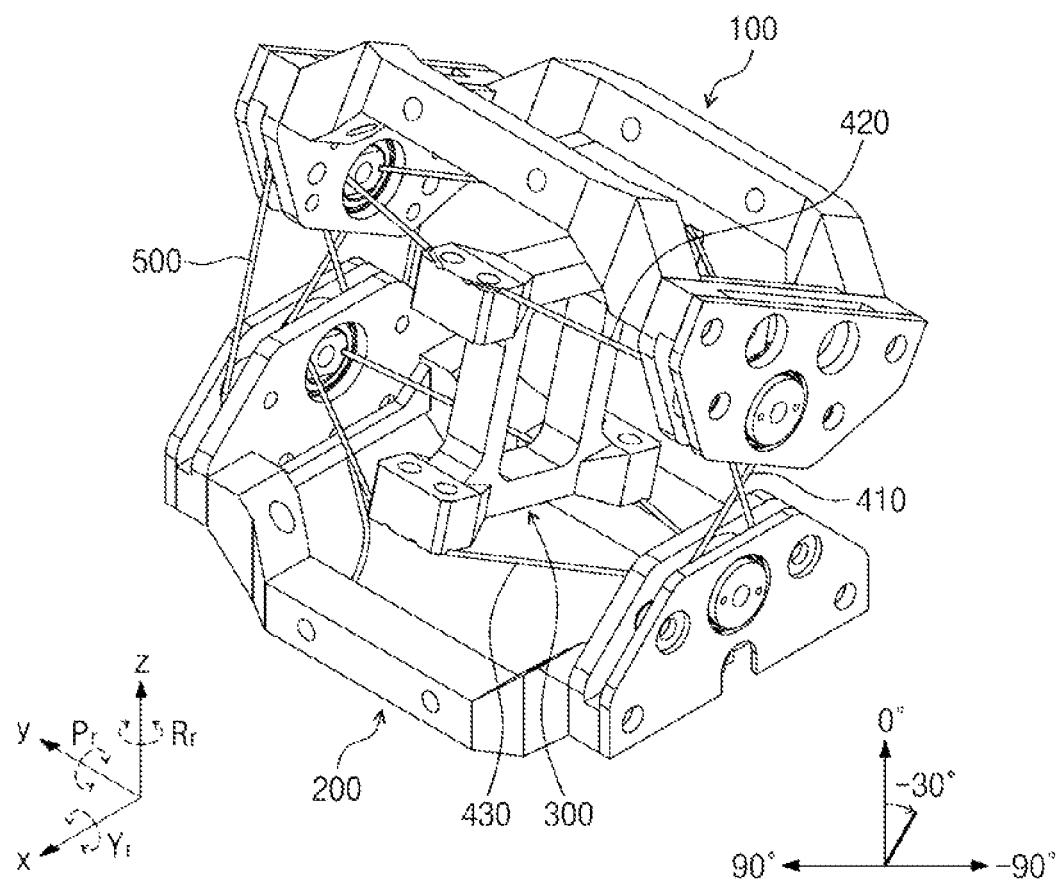
Figure 11:
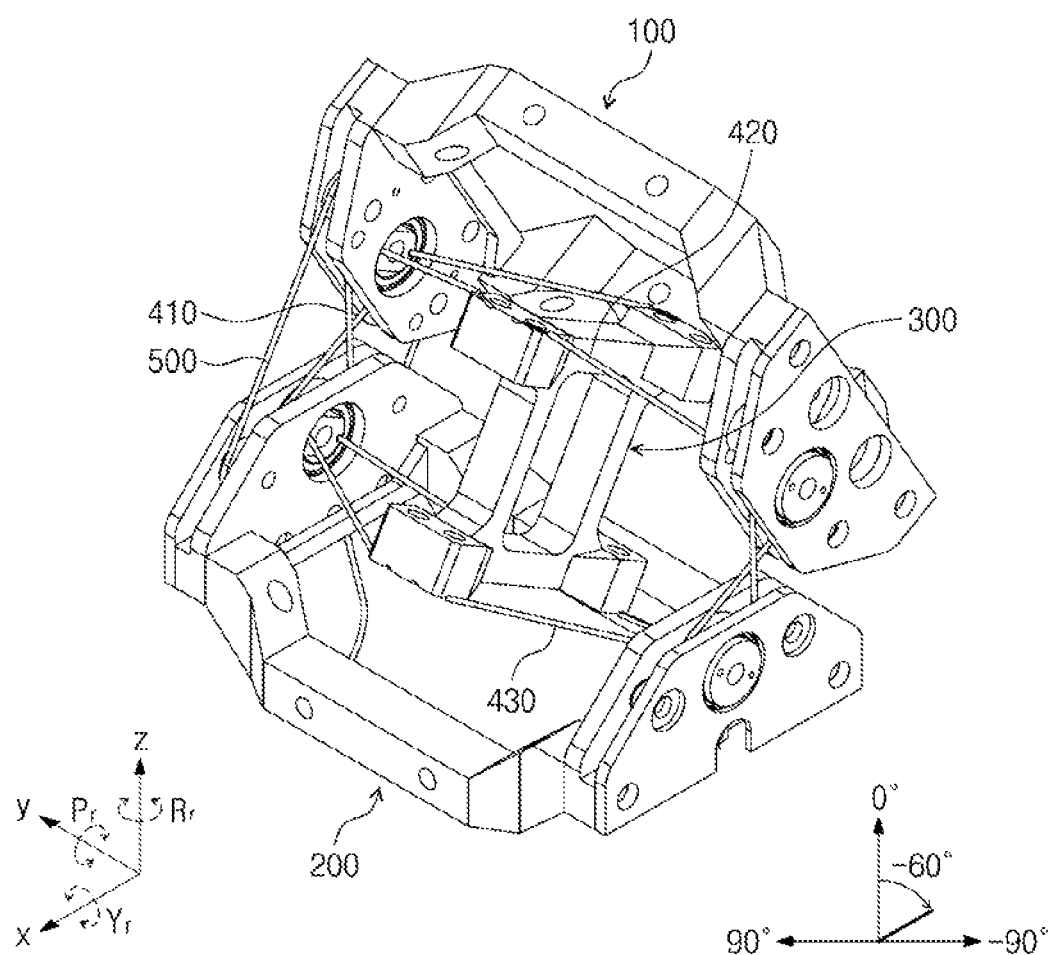

Similarly, referring to FIGS. 10 and 11, even when the pitch rotation angle of the first body 100 in an opposite direction is gradually increased to −30 degrees and −60 degrees, the non-contact state between the first body 100 and the second body 200 may be maintained. Accordingly, abrasion caused by friction between the bodies 100 and 200 may be prevented.

Figure 12:
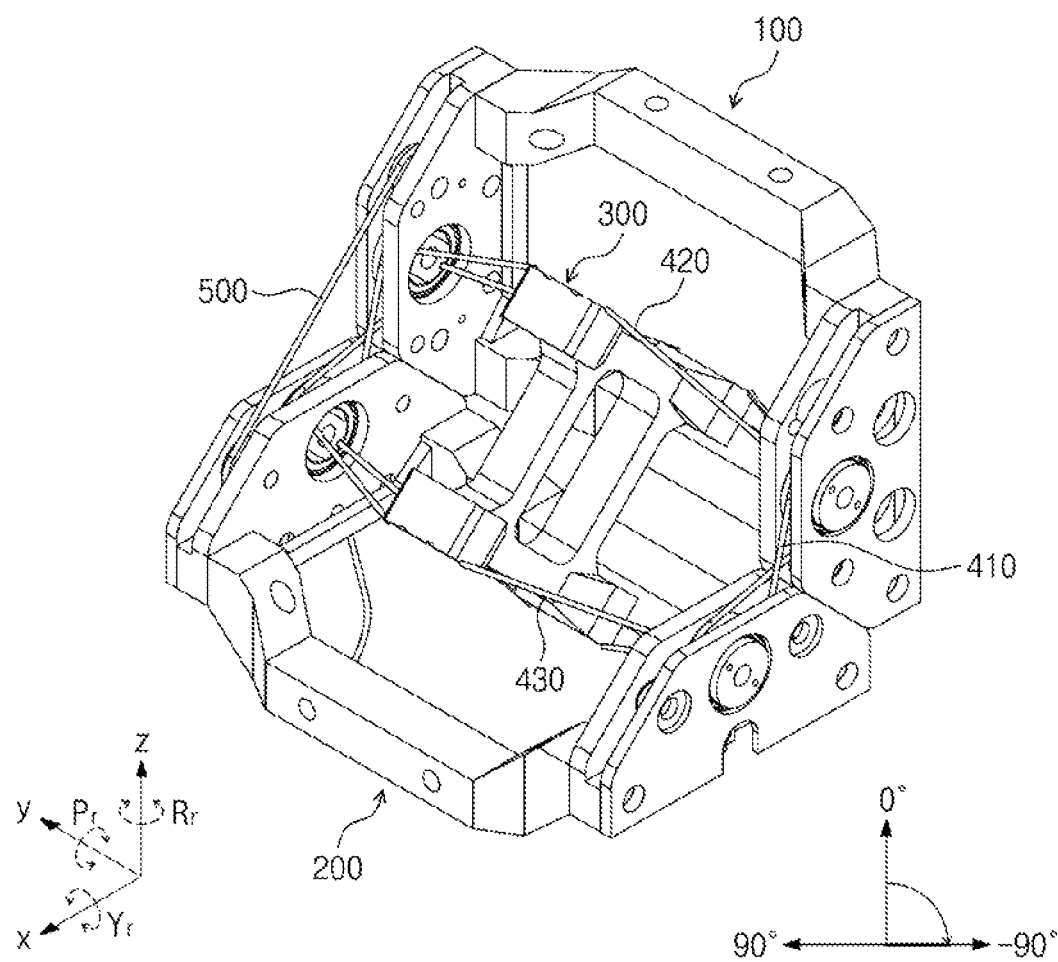

Thereafter, referring to FIG. 12, when the pitch rotation angle of the first body 100 in the opposite direction reaches a set maximum rotation angle of −90 degrees, an opposite inclined surface 120*b* of the first body 100 and an opposite inclined surface 220*b* of the second body 200 corresponding to the opposite inclined surface 120*b* of the first body 100 may make contact with each other, so that a further pitch rotation of the first body 100 may be restricted. The maximum rotation angle of the first body 100 in the opposite direction may be increased or decreased by adjusting the inclinations of the opposite inclined surface 120*b* of the first body 100 and the opposite inclined surface 220*b* of the second body 200.

Figure 13:
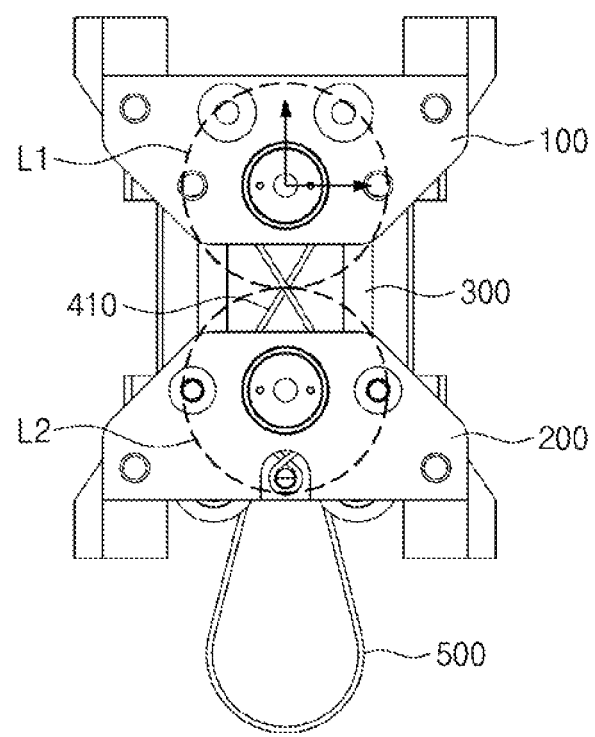
FIGS. 13 to 15 are reference views for describing the rotation of the roll joint according to one embodiment of the present invention.
Figure 14:
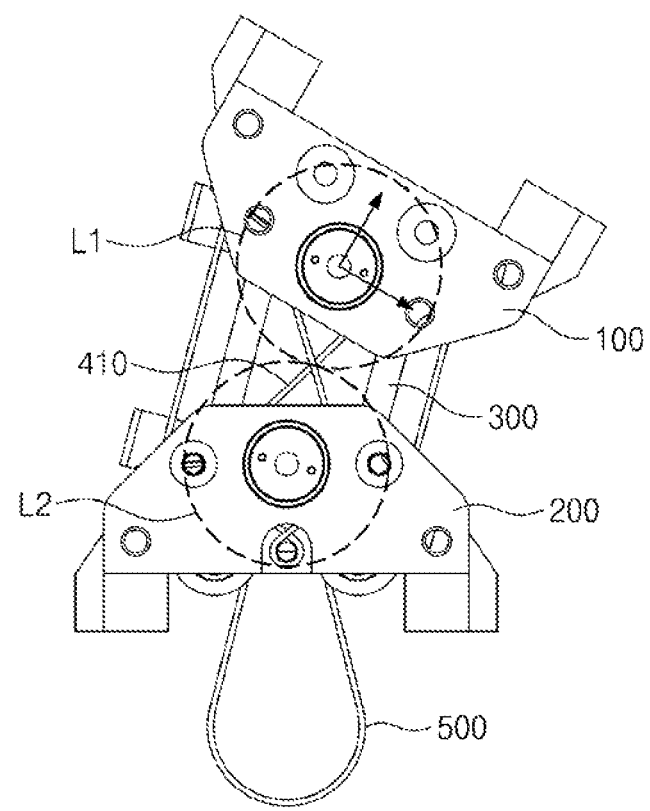
Figure 15:
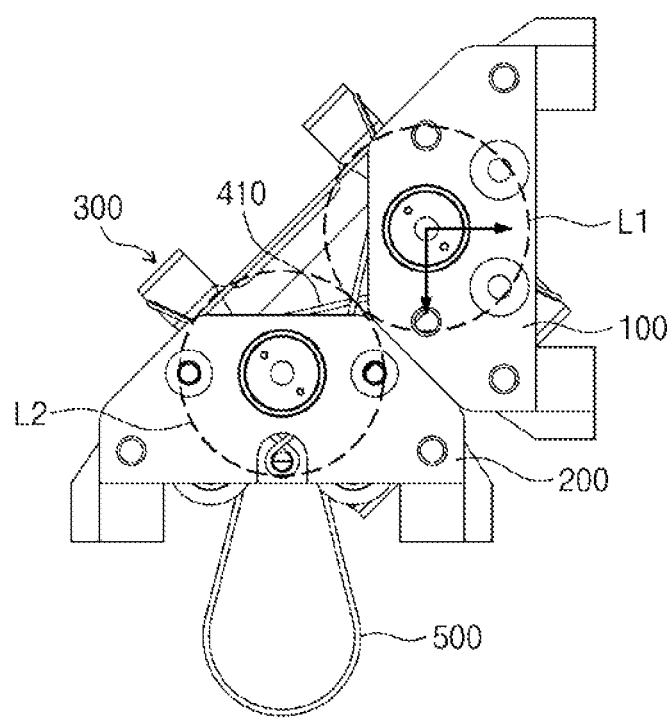

Meanwhile, FIGS. 13 to 15 are reference views for describing the rotation of the roll joint according to one embodiment of the present invention.

Referring to FIGS. 13 to 15, when the driving wire member 500 moves in the direction in which the rotation shaft of the driving motor (600 of FIG. 4) rotates so as to pull the one side or the opposite side of the first body 100 toward the second body 200, the first body 100 may pitch-rotate about the second body 200 such that a first virtual circle L1 formed by the first body 100 may roll in a circumferential direction of a second virtual circle L2 on the second virtual circle L2 formed by the second body 200.

In other words, according to one embodiment of the present invention, when the first body 100 pitch-rotates, while the first virtual circle L1 formed by the first body 100 and the second virtual circle L2 formed by the second body 200 may make only virtual contact with each other, the first body 100 and the second body 200 may be maintained in the non-contact state.

Hereinafter, the roll joint according to one embodiment of the present invention will be described with reference to FIGS. 16 to 20.

Figure 16:
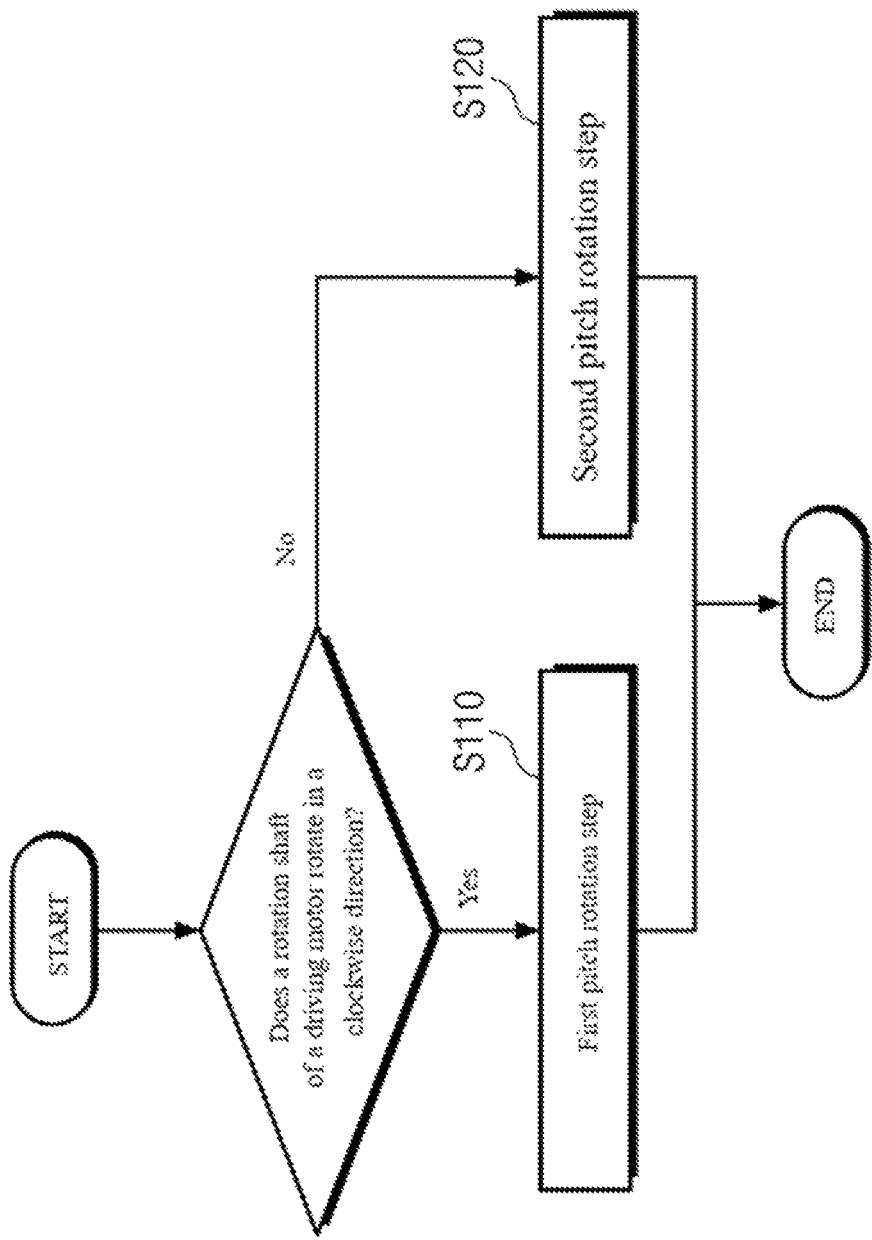
FIG. 16 is a flowchart showing a method of driving a roll joint according to one embodiment of the present invention.

FIG. 16 is a flowchart showing a method of driving a roll joint according to one embodiment of the present invention, FIGS. 17 and 18 are schematic views showing a step S110 in the method of driving the roll joint according to one embodiment of the present invention, and FIGS. 19 and 20 are schematic views showing a step S120 in the method of driving the roll joint according to one embodiment of the present invention.

Referring to FIG. 16, according to one embodiment of the present invention, a method of driving a roll joint may include a first pitch rotation step S110 and a second pitch rotation step S120.

According to the method of driving the roll joint of one embodiment of the present invention, first, a direction in which a rotation shaft of a driving motor 600 rotates is determined. When the rotation shaft of the driving motor 600 rotates in a clockwise direction, the first pitch rotation step S110 may be performed.

Referring to FIGS. 17 and 18, in the first pitch rotation step S110, when the rotation shaft of the driving motor 600 is rotated in the clockwise direction, a driving wire member 500 connected to the rotation shaft to interwork with the rotation shaft and having both ends in a longitudinal direction that are fixed to left and right wire mounters 123 of a second frame 120, respectively, may move so as to pull a right side (based on the drawing) of a first body 100 toward a second body 200.

Accordingly, the first body 100 may be gradually pitch-rotated about the second body 200 up to −90 degrees that is set as a maximum pitch rotation angle.

Meanwhile, when the rotation shaft of the driving motor 600 rotates in a counterclockwise direction, the second pitch rotation step S120 may be performed.

Referring to FIGS. 19 and 20, in the second pitch rotation step S120, when the rotation shaft of the drive motor 600 is rotated the counterclockwise direction, the driving wire members 500 connected to the rotation shaft to interwork with the rotation shaft and having both ends in the longitudinal direction that are fixed to the left and right wire mounters 123 of the second frame 120, respectively, may move so as to pull a left side (based on the drawing) of the first body 100 toward the second body 200.

Accordingly, the first body 100 may be gradually pitch-rotated about the second body 200 up to 90 degrees that is set as the maximum pitch rotation angle.

Although the exemplary embodiments of the present invention have been described in detail, the scope of the present invention is not limited to a specific embodiment, and should be interpreted by the appended claims. In addition, it should be understood by those of ordinary skill in the art that various changes and modifications can be made without departing from the scope of the present invention.

The invention claimed is:

1. A roll joint comprising:
a first body;
a second body disposed opposite to and spaced apart from the first body;
a connection body disposed between the first body and the second body without making contact with the first body and the second body;
a connection wire member for connecting the first body, the second body, and the connection body to each other so as to form a tensegrity structure;
a driving wire member; and
a driving motor for operating the driving wire member,
wherein the driving wire member is connected to the first body and the second body such that both ends of the driving wire member in the longitudinal direction are fixed to one side and an opposite side of the first body, respectively, and a center portion of the driving wire member in the longitudinal direction is connected to a rotation shaft of the driving motor, and the driving wire member moves in a direction in which the rotation shaft of the driving motor rotates so as to pull the one side or the opposite side of the first body such that a virtual circle formed by the first body rolls in a circumferential direction on a virtual circle formed by the second body.

2. The roll joint of claim 1, wherein, when viewed in a direction from the second body towards the first body or from the first body towards the second body, the first body has flexibility in a yaw direction, a roll direction, and the direction from the second body towards the first body or from the first body towards the second body.

3. The roll joint of claim 1, wherein the connection wire member includes:
a first connection wire for connecting the first body to the second body;
a second connection wire for connecting the first body to the connection body; and
a third connection wire for connecting the second body to the connection body, and
the first to third connection wires achieve equilibrium of force so as to maintain the tensegrity structure.

4. The roll joint of claim 3, wherein the first body includes a first frame extending in one direction, and second frames provided at both ends of the first frame in a longitudinal direction, respectively,
the second body includes a third frame extending in the one direction and facing the first frame, and fourth frames provided at both ends of the third frame in the longitudinal direction and facing the second frames, respectively, and
the connection body includes a fifth frame disposed in a vertical direction between the first body and the second body, first and second wire connectors provided on an upper side of the fifth frame in a width direction, and third and fourth wire connectors provided on a lower side of the fifth frame in the width direction.

5. The roll joint of claim 4, wherein each of end surfaces of the second and fourth frames, which face each other, includes a horizontal surface, and inclined surfaces extending from both ends of the horizontal surface in the longitudinal direction, respectively, and
the inclined surfaces on both sides have a same inclination.

6. The roll joint of claim 1, wherein the first body has one rotational degree of freedom with respect to the second body, and the first body is pitch-rotatable with respect to the second body in a range of −90 degrees to 90 degrees.

7. A roll joint comprising:

a first body;

a second body disposed opposite to and spaced apart from the first body;

a connection body disposed between the first body and the second body without making contact with the first body and the second body; and a connection wire member for connecting the first body, the second body, and the connection body to each other so as to form a tensegrity structure, wherein the connection wire member includes:

a first connection wire for connecting the first body to the second body;

a second connection wire for connecting the first body to the connection body; and a third connection wire for connecting the second body to the connection body, wherein the first to third connection wires achieve equilibrium of force so as to maintain the tensegrity structure, wherein the first body includes a first frame extending in one direction, and second frames provided at both ends of the first frame in a longitudinal direction, respectively, wherein the second body includes a third frame extending in the one direction and facing the first frame, and fourth frames provided at both ends of the third frame in the longitudinal direction and facing the second frames, respectively, wherein the connection body includes a fifth frame disposed in a vertical direction between the first body and the second body, first and second wire connectors provided on an upper side of the fifth frame in a width direction, and third and fourth wire connectors provided on a lower side of the fifth frame in the width direction, and wherein the first connection wire connects the second frame to the fourth frame, and includes a withdrawal line extending from the second frame and wound on the fourth frame, and a recovery line connected to the withdrawal line, extending from the fourth frame, and recovered on the second frame.

8. The roll joint of claim 7, wherein the withdrawal line and the recovery line intersect with each other at least once.

9. A roll joint comprising:

a first body;

a second body disposed opposite to and spaced apart from the first body;

a connection body disposed between the first body and the second body without making contact with the first body and the second body; and a connection wire member for connecting the first body, the second body, and the connection body to each other so as to form a tensegrity structure, wherein the connection wire member includes:

a first connection wire for connecting the first body to the second body;

a second connection wire for connecting the first body to the connection body; and a third connection wire for connecting the second body to the connection body, wherein the first to third connection wires achieve equilibrium of force so as to maintain the tensegrity structure, wherein the first body includes a first frame extending in one direction, and second frames provided at both ends of the first frame in a longitudinal direction, respectively, wherein the second body includes a third frame extending in the one direction and facing the first frame, and fourth frames provided at both ends of the third frame in the longitudinal direction and facing the second frames, respectively, wherein the connection body includes a fifth frame disposed in a vertical direction between the first body and the second body, first and second wire connectors provided on an upper side of the fifth frame in a width direction, and third and fourth wire connectors provided on a lower side of the fifth frame in the width direction, wherein a plurality of second connection wires are provided, and wherein the second connection wires connect the second frame on one side and the first wire connector, the second frame on the one side and the second wire connector, the second frame on an opposite side and the first wire connector, and the second frame on the opposite side and the second wire connector, respectively.

10. A roll joint comprising:

a first body;

a second body disposed opposite to and spaced apart from the first body;

a connection body disposed between the first body and the second body without making contact with the first body and the second body; and a connection wire member for connecting the first body, the second body, and the connection body to each other so as to form a tensegrity structure, wherein the connection wire member includes:

a first connection wire for connecting the first body to the second body;

a second connection wire for connecting the first body to the connection body; and a third connection wire for connecting the second body to the connection body, and the first to third connection wires achieve equilibrium of force so as to maintain the tensegrity structure, wherein the first body includes a first frame extending in one direction, and second frames provided at both ends of the first frame in a longitudinal direction, respectively, wherein the second body includes a third frame extending in the one direction and facing the first frame, and fourth frames provided at both ends of the third frame in the longitudinal direction and facing the second frames, respectively, wherein the connection body includes a fifth frame disposed in a vertical direction between the first body and the second body, first and second wire connectors provided on an upper side of the fifth frame in a width direction, and third and fourth wire connectors provided on a lower side of the fifth frame in the width direction, wherein a plurality of third connection wires are provided, and wherein the third connection wires connect the fourth frame on one side and the third wire connector, the fourth frame on the one side and the fourth wire connector, the fourth frame on an opposite side and the third wire connector, and the fourth frame on the opposite side and the fourth wire connector, respectively.

\* \* \* \* \*